(12) United States Patent
Sakamoto et al.

(10) Patent No.: US 7,016,591 B2
(45) Date of Patent: Mar. 21, 2006

(54) OPTICAL WAVEGUIDE COMPONENT CAPABLE OF PREVENTING AN OPTICAL WAVEGUIDE MEMBER FROM BEING ECCENTRIC AND METHOD OF PRODUCING THE SAME

(75) Inventors: Akihiko Sakamoto, Shiga (JP); Hideki Asano, Otsu (JP); Masanori Wada, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 234 days.

(21) Appl. No.: 10/349,986

(22) Filed: Jan. 23, 2003

(65) Prior Publication Data

US 2003/0152341 A1    Aug. 14, 2003

(30) Foreign Application Priority Data

Jan. 24, 2002   (JP)   ............................. 2002-015684
Dec. 17, 2002   (JP)   ............................. 2002-365630

(51) Int. Cl.
*G02B 6/00*   (2006.01)

(52) U.S. Cl. ..................................... 385/136; 385/137

(58) Field of Classification Search ........ 385/136–140; 65/404, 412
See application file for complete search history.

(56) References Cited

U.S. PATENT DOCUMENTS

| 4,583,851 A * | 4/1986 | Yataki ........................ 356/73.1 |
| 6,259,830 B1 * | 7/2001 | Bhagavatula ................... 385/2 |
| 6,746,160 B1 * | 6/2004 | Takeuti et al. ................ 385/84 |

FOREIGN PATENT DOCUMENTS

| EP | 0909967 | * | 4/1999 | |
| JP | 9152524 | | 6/1997 | ................. 385/134 |
| JP | 2000047036 | | 2/2000 | ................. 385/140 |

* cited by examiner

*Primary Examiner*—Frank G. Font
*Assistant Examiner*—Christopher M. Kalivoda
(74) *Attorney, Agent, or Firm*—Collard & Roe, P.C.

(57) ABSTRACT

An optical waveguide member is inserted into a tubular member. The tubular member is elongated with heating and fusion-bonded to the optical waveguide member. Thus, a formed body is obtained. The formed body is cut into a predetermined length to obtain an optical waveguide member. The tubular member is preferably made of a crystallized glass with crystals deposited therein at least in the state of the formed body.

8 Claims, 2 Drawing Sheets

OPTICAL WAVEGUIDE COMPONENT CAPABLE OF PREVENTING AN OPTICAL WAVEGUIDE MEMBER FROM BEING ECCENTRIC AND METHOD OF PRODUCING THE SAME

CROSS REFERENCE TO RELATED APPLICATIONS

This application claims priority to prior applications JP 2002-15684 and JP 2002-365630, the disclosures of which are incorporated herein by reference.

BACKGROUND OF THE INVENTION

The present invention relates to an optical waveguide component used as a fiber stub or an optical attenuator stub in an optical communication system and a method of producing the same.

In an optical communication system, a light emitting module for coupling a light beam from a light source to an optical fiber, a light receiving module for detecting an optical signal from the optical fiber, and an optical attenuator for adjusting an optical power propagating through the optical fiber are important devices. Among these devices, the light emitting module or the light receiving module is provided with an optical waveguide component called a fiber stub. The fiber stub is connected to an optical connector. On the other hand, the optical attenuator is provided with an optical waveguide component called an optical attenuator stub. The optical attenuator stub is also coupled to the optical connector.

The optical connector comprises a capillary tube, called a ferrule, having a high dimensional accuracy. An optical waveguide member is inserted into the ferrule and fixed thereto. Thus, the optical waveguide member is accurately positioned. Therefore, the fiber stub or the optical attenuator stub to be coupled to the optical connector is also required to have a dimensional accuracy equivalent to that of the ferrule. As the optical waveguide member, an ordinary or common optical fiber and an optical attenuation fiber are used for the fiber stub and the optical attenuator stub, respectively.

For example, Japanese Unexamined Patent Publication No. 2000-47036 (JP 2000-47036 A) discloses an optical attenuator stub comprising a ferrule as a positioning member and an optical attenuation fiber as an optical waveguide member inserted into the ferrule and fixed to the ferrule by an adhesive. The ferrule of the optical attenuator stub has a bore diameter greater than the diameter of the optical attenuation fiber by about 1 $\mu$m so that the optical attenuation fiber is easily inserted.

However, the above-mentioned optical attenuator stub is disadvantageous in the following respect. When the optical attenuation fiber is inserted into the ferrule, a clearance of about 1 $\mu$m is left between the optical attenuation fiber and the ferrule. Therefore, the optical attenuation fiber may be eccentric with respect to the ferrule by about 0.5 $\mu$m at maximum. In this event, optical axis misalignment is caused when the optical attenuation fiber is coupled to the optical connector. This may result in an increase in connection loss of an optical signal. Furthermore, a light beam propagating outside a core, i.e., a so-called clad mode, may be increased to interfere with a signal beam. The increase in connection loss due to the above-mentioned eccentricity is a serious problem not only in the optical attenuator stub but also in the fiber stub.

When the temperature is elevated, the optical attenuation fiber may be retracted with respect to the ferrule due to the difference in expansion coefficient between the ferrule and the optical attenuation fiber. This also results in an increase in connection loss. If the temperature is further elevated to become higher than the glass transition point of the adhesive, the adhesive may be deformed or deteriorated. In this event, the fiber can not be held at a predetermined position. As a result, the connection loss is increased and, in the worst case, PC (Physical Contact) connection is impossible so that the light beam can not be guided or propagated at all.

Japanese Unexamined Patent Publication No. H09-152524 discloses a method of producing a fiber stub. The method comprises the steps of preliminarily firing a ferrule as a positioning member, inserting an optical fiber as an optical waveguide member into the preliminarily-fired ferrule, and full-firing the ferrule to thermally contract or shrink the ferrule, thereby fixing the optical fiber to the ferrule. According to this method, the optical fiber can be fixed without using the adhesive. In this respect, the production process can be simplified. In addition, since the optical fiber is fixed to the ferrule in tight contact therewith, it is possible to prevent the optical fiber from being eccentric due to presence of clearance.

However, this method requires a large number of careful and delicate operations of inserting the optical fibers into the ferrules, i.e., capillary tubes one by one. In addition, this method requires a complicated process in which the ferrule is preliminarily fired and then full-fired. It is therefore difficult to obtain an inexpensive product. Furthermore, since the contraction ratio of the ferrule at the firing step widely varies, the position of the optical fiber may be misaligned from a center axis of the ferrule. In addition, it is difficult to achieve a high circularity of the outer diameter of the ferrule. It is therefore required to execute a polishing step of polishing an outer periphery of the ferrule with respect to the optical fiber. This results in an increase in cost.

SUMMARY OF THE INVENTION

It is therefore an object of the present invention to provide an optical waveguide component in which an optical waveguide member is prevented from being eccentric with respect to a positioning member.

It is another object of the present invention to provide an optical waveguide component in which an optical waveguide member is prevented from being retracted or protruded with respect to a positioning member even if the temperature is elevated.

It is still another object of the present invention to provide an optical waveguide component which has a high heat resistance and which can be produced at a low cost.

It is yet another object of the present invention to provide a method of producing an optical waveguide component in which an optical waveguide member is prevented from being eccentric with respect to a positioning member It is a further object of the present invention to provide a method of producing an optical waveguide component in which an optical waveguide member is prevented from being retracted or protruded with respect to a positioning member even if the temperature is elevated.

It is a still further object of the present invention to provide a method of producing an optical waveguide component which has a high heat resistance and which can be produced at a low cost.

According to an aspect of the present invention, there is provided an optical waveguide component comprising a positioning member heated and elongated in a predetermined direction and having a hole extending in the predetermined direction, and an optical waveguide member disposed in the hole and fusion-bonded and fixed to the positioning member.

According to another aspect of the present invention, there is provided a method of producing an optical waveguide component, comprising the steps of preparing a tubular member, inserting an optical waveguide member into the tubular member, heating and elongating the tubular member to fusion-bond the tubular member to the optical waveguide member so that a formed body is obtained, and cutting the formed body into a predetermined length.

DESCRIPTION OF THE PREFERRED EMBODIMENT

Figure 1:
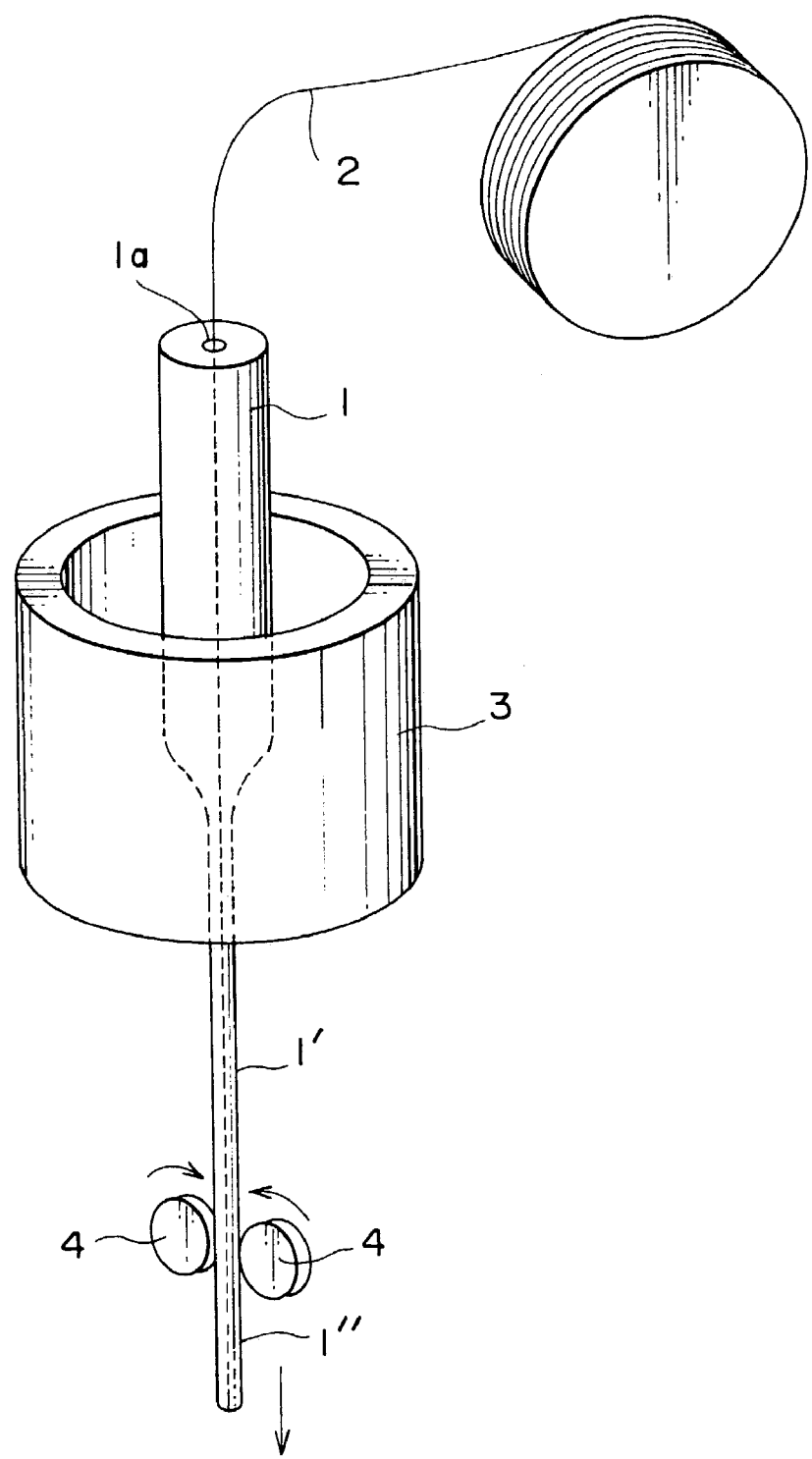
FIG. 1 is a schematic view for describing a method of producing an optical waveguide component according to an embodiment of the present invention.
Figure 2:
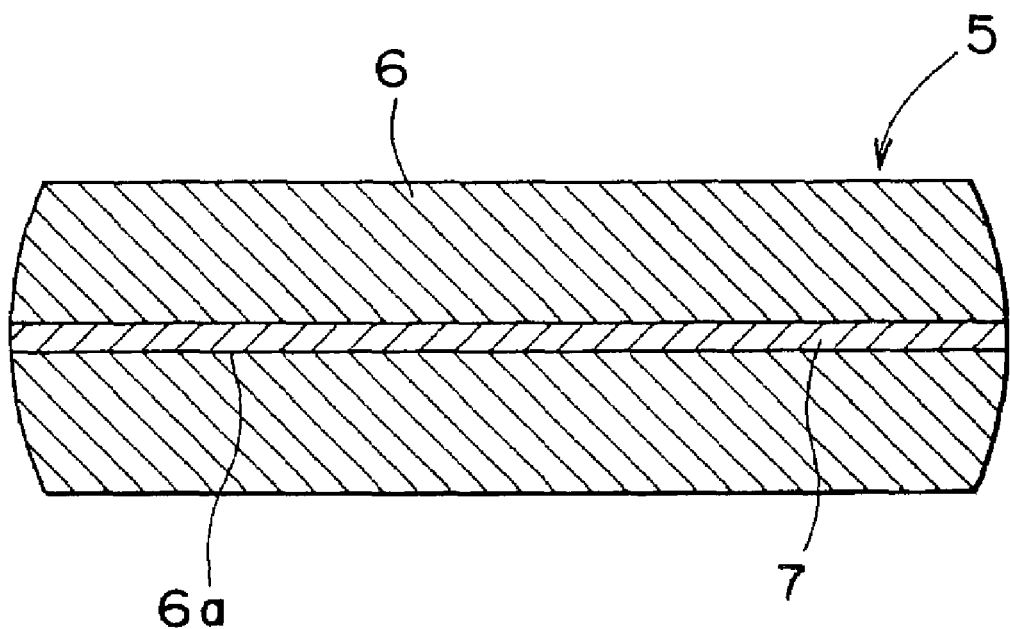
FIG. 2 is an enlarged perspective view of the optical waveguide component produced by the method illustrated in FIG. 1 with an intermediate portion thereof omitted.

Referring to FIGS. 1 and 2, description will be made of an optical waveguide component according to an embodiment of the present invention together with a method of producing the same.

At first referring to FIG. 1, a preform 1 as a tubular member has a hole 1a. A single mode optical fiber 2 made of a silica glass is inserted into the hole 1a. The hole 1a of the preform 1 is relatively large so that the optical fiber 2 is easily inserted into the hole 1a.

In this state, the preform 1 is continuously fed into an annular electric furnace 3 through an upper opening thereof. The preform 1 is heated by the annular electric furnace 3 to be softened. The preform 1 is elongated in a predetermined direction, i.e., in a downward direction and narrowed in diameter to be deformed into a deformed body 1'.

A lower end of the deformed body 1' is clamped between a pair of rollers 4 and subjected to so-called drawing at a predetermined temperature to obtain a formed body 1" having a predetermined outer diameter. In cooperation or in synchronism with the drawing, the optical fiber 2 is continuously supplied to the preform 1, i.e., into the hole 1a of the preform 1. Furthermore, the formed body 1" is cut into a predetermined length. After cutting, opposite ends of the formed body 1" are subjected to polishing in the manner similar to that in a MU (Miniature Unit coupling)-type optical connector. Thus, an optical waveguide component 5 illustrated in FIG. 2 is produced.

The optical waveguide component 5 thus obtained comprises a positioning member 6 heated and elongated in the predetermined direction and having a hole 6a extending along a center axis thereof in the predetermined direction, and an optical waveguide member 7 disposed in the hole 6a of the positioning member 6 and fusion-bonded and fixed to the positioning member 6.

In the optical waveguide component 5, no clearance is left between the positioning member 6 and the optical waveguide member 7. Therefore, the optical waveguide member 7 is prevented from being eccentric with respect to the hole 6a of the positioning member 6 so that the optical waveguide member 7 is positioned on the center axis of the positioning member 6. Furthermore, the positioning member 6 and the optical waveguide member 7 are fixed by the use of fusion-bonding of the positioning member 6. Therefore, even if the temperature is elevated and the positioning member 6 is expanded, the optical waveguide member 7 is not retracted or protruded with respect to the positioning member 6. Accordingly, the optical waveguide component 5 has a high heat resistance. In addition, without requiring a step of inserting each individual optical waveguide member 7 into the hole 6a of each positioning member 6 and a step of full-firing being performed after a step of preliminarily firing, the optical waveguide component 5 containing the optical waveguide member 7 can be continuously and successively produced. Thus, the optical waveguide component 5 can be produced with a very high efficiency and at a low cost.

As the positioning member 6, use may be made of a material, such as glass or plastic, which can be heated and elongated. As the glass, a common glass can be used. However, a crystallized glass is preferable because it is excellent in environment resistance as well as mechanical characteristics such as fracture strength and abrasion resistance. In addition, a borosilicate glass is also preferable because it is excellent in environment resistance and has a small coefficient of thermal expansion.

Preferably, the positioning member 6 has a coefficient of thermal expansion of $-20\times10^{-7}/°$ C. to $70\times10^{-7}/°$ C. at 30° C. to 380° C. If the coefficient of thermal expansion is smaller than $-20\times10^{-7}/°$ C., it is difficult to obtain a material which can be heated and elongated. On the other hand, if the coefficient of thermal expansion is greater than $70\times10^{-7}/°$ C., thermal stress resulting from the difference in thermal expansion between the optical waveguide member 7 and the positioning member 6 is increased. This may result in easy occurrence of cracks at the interface between the optical waveguide member 7 and the positioning member 6 and in easy separation of the optical waveguide member 7 and the positioning member 6. Thus, the coefficient of thermal expansion beyond the above-mentioned range ($-20\times10^{-7}/°$ C. to $70\times10^{-7}/°$ C.) is not preferable.

The above-mentioned preform 1 can be produced from any one of a common glass, a crystallizable glass, and a crystallized glass. It is noted here that the crystallizable glass is a glass which contains no crystals deposited therein before heated and elongated and which can be transformed into the crystallized glass by depositing crystals when heated and elongated. The crystallized glass is a glass in which crystals are already deposited in the state of the preform 1.

The common optical fiber has a softening point ($10^{7.6}$ dPa·s) around 1600–1700° C. Therefore, the preform 1 is heated and elongated preferably at a temperature lower than 1300° C. In this case, the preform 1 can be heated and elongated without softening the optical fiber 2. Therefore, the function inherent to the optical fiber 2 is not deteriorated.

In particular, as the crystallizable glass or the crystallized glass, use is made of a glass containing at least 45 mass %, preferably, at least 65 mass % $SiO_2$, $Al_2O_3$, and $Li_2O$ in total. The glass having the above-mentioned composition can be subjected to drawing. In addition, the positioning member 6 having a small coefficient of thermal expansion can be easily obtained and can be formed with a high accuracy and at a high efficiency.

Preferably, deposited crystals of the crystallized glass are β-spodumene solid solution because the positioning member excellent in mechanical characteristics, high in accuracy, low in thermal expansion, and superior in environment resistance is easily obtained.

Next, a method of producing the optical waveguide component 5 illustrated in FIG. 2 will be described in detail.

At first, a circular cylindrical or a rectangular cylindrical material made of a glass, a crystallizable glass, or a crystallized glass is prepared and subjected to drilling to form a through hole. Thus, a preform having a tubular shape is obtained. Alternatively, the preform having a through hole may be formed by extrusion or casting. The preform is used as a positioning member with an analogous sectional shape maintained or kept unchanged. Therefore, the outer diameter of the preform and the diameter of the hole must be equal to predetermined sizes.

Next, an optical waveguide member is inserted into the hole of the preform. The optical waveguide member may be an optical fiber made of a silica glass or an optical attenuation fiber doped with a transition metal such as cobalt, iron, and nickel. Thereafter, the preform is heated and elongated to produce the positioning member having an outer diameter and an inner diameter with a dimensional accuracy equivalent to a ferrule used for an optical connector. The optical waveguide member is fusion-bonded and fixed to the hole of the positioning member thus obtained. Finally, the preform is cut into a desired length and end faces thereof are polished into a predetermined shape. Thus, the optical waveguide component, such as a fiber stub and an optical attenuator stub, is obtained.

Hereinafter, this invention will be described in detail in conjunction with various specific examples.

Table 1 shows the specific examples 1 to 4 of this invention. Table 2 shows comparative examples 5 to 7.

TABLE 1

|  | Example 1 | Example 2 | Example 3 | Example 4 |
|---|---|---|---|---|
| Material of Preform | crystallized glass | borosilicate glass | crystallized glass | borosilicate glass |
| Material of Ferrule | crystallized glass | borosilicate glass | crystallized glass | borosilicate glass |
| Composition (mass %) |  |  |  |  |
| $Si_2O$ | 65 | 75 | 66.5 | 80 |
| $Al_2O_3$ | 18 | 7 | 22 | 2 |
| $Li_2O$ | 5 | — | 4.5 | — |
| $K_2O$ | 8 | 1 | 4 | — |
| CaO | 4 | — | 2 | — |
| $Na_2O$ | — | 7 | 1 | 4 |
| $B_2O_3$ | — | 10 | — | 14 |
| Coefficient of Thermal Expansion ($\times 10^{-7}/°$ C.) | 25 | 55 | 20 | 38 |
| Production of Optical Waveguide Component | drawing | drawing | drawing | drawing |
| Eccentricity ($\mu$m) | <0.1 | <0.1 | <0.1 | <0.1 |
| Propagation Mode | single | single | single | single |
| Connection Loss (dB) | 0.05 | 0.05 | 0.1 | 0.1 |
| Retraction (nm) of Fiber at 100° C. | 0 | 0 | 0 | 0 |

TABLE 2

|  | Comparative Example 5 | Comparative Example 6 | Comparative Example 7 |
|---|---|---|---|
| Material of Preform | — | — | — |
| Material of Ferrule | crystallized glass | borosilicate glass | ceramics |
| Composition (mass %) |  |  |  |
| $SiO_2$ | 65 | 75 | — |
| $Al_2O_3$ | 18 | 7 | — |
| $Li_2O$ | 5 | — | — |
| $K_2O$ | 8 | 1 | — |
| CaO | 4 | — | — |
| $Na_2O$ | — | 7 | 0 |
| $B_2O_3$ | — | 10 | — |
| $ZrO_2$ | — | — | 95 |
| $Y_2O_3$ |  |  | 5 |
| Coefficient of Thermal Expansion ($\times 10^{-7}/°$ C.) | 25 | 55 | 83 |
| Production of Optical Waveguide Component | adhesion | adhesion | adhesion |
| Eccentricity ($\mu$m) | 0.5 | 0.5 | 0.5 |
| Propagation Mode | single | single | single |
| Connection Loss (dB) | 0.2 | 0.3 | 0.3 |
| Retraction (nm) of Fiber at 100° C. | 10 | 25 | 50 |

At first, a glass having each of compositions shown in Tables 1 and 2 was melted in an electric furnace kept at 1580° C. for 10 hours and then cast into a cylindrical glass body having a diameter of 100 mm. Thereafter, the cylindrical glass body was heated at 1100° C. for two hours to be crystallized. Then, a through hole having a diameter of 5 mm was formed at the center of the cylindrical glass body by the use of a drill. Thus, a tubular preform made of a crystallized glass was produced in each of the specific examples 1 and 3 and the comparative example 5. On the other hand, a glass having each of compositions shown in Tables 1 and 2 was melted in an electric furnace kept at 1500° C. for 10 hours and then cast into a cylindrical glass body having a diameter of 100 mm. Then, a through hole having a diameter of 5 mm was formed at the center of the cylindrical glass body by the use of a drill. Thus, a tubular preform made of a borosilicate glass was produced in each of the specific examples 2 and 4 and the comparative example 6.

A single mode optical fiber made of a silica glass and having a diameter of 125 $\mu$m was inserted into the hole of the preform. The preform was continuously fed into an annular electric furnace through its upper opening at a feeding rate of 1 mm/min. The preform was heated by the annular electric furnace to be softened and deformed. As a result, the preform was elongated downward to become a deformed body. A lower end of the deformed body softened and elongated was clamped by a pair of rollers and subjected to drawing at 1180° C. and at 900° C. in case of a crystallized glass and in case of a borosilicate glass, respectively. Thus, a formed body was produced at a rate of 6400 mm/min so that the formed body has an outer diameter of 1.25 mm±0.5 $\mu$m. In cooperation or in synchronism with the drawing, the optical fiber 2 was continuously fed to the preform, i.e., into the hole of the preform.

The formed body obtained by the drawing was cut into the length of 16.7 mm. Thereafter, opposite ends of the formed body were polished in the manner similar to that for a MU-type optical connector to produce an optical waveguide component.

In the comparative example 5 or 6, an optical waveguide component was produced in the manner similar to the specific examples 1 and 2 except the following. The optical fiber was not inserted into the through hole of the preform. Drawing was carried out at 1180° C. or 900° C. to produce a ferrule having a hole having an inner diameter of 126 μm. Thereafter, a single mode optical fiber was inserted into the ferrule and fixed thereto by an epoxy adhesive. In the comparative example 7, an optical waveguide component was produced in the manner similar to the comparative examples 5 and 6 except that a single mode optical fiber was inserted into a zirconia ferrule commercially available.

The coefficient of thermal expansion was measured by the Dilatometer 5000 manufactured by MAC Science Co., Ltd. within a temperature range between 30 and 380° C. The eccentricity of the optical fiber in the hole of the optical waveguide member was obtained by observing the section of the optical waveguide component by the use of a scanning electron microscope (SEM) and evaluating a SEM photograph.

A propagation mode was confirmed in the following manner. A laser diode having a wavelength of 1.3 μm was used as a light source. A light beam emitted from the laser diode is incident through the single mode optical fiber to the optical waveguide component from its one end. At an emitting end, an image of an end face was picked up by a camera to examine the distribution of light emission intensity.

The optical connection loss was measured in the following manner. One end of the optical waveguide component was connected to a single mode optical fiber via an MU-type optical connector. Another end of the optical waveguide component was connected to an optical power meter (Q8221 manufactured by Advantest Corporation) via another MU-type optical connector. Through the single mode optical fiber, an input light beam having the wavelength of 1.3 μm was incident to the optical waveguide component. An output light beam was measured by the optical power meter. By comparing the output light beam with the input light beam, the optical connection loss was measured.

The amount of retraction of the optical fiber upon heating was obtained in the following manner. By the use of ACCIS manufactured by Norland Products Inc., the positions of the optical fiber with respect to the positioning member were measured at room temperature and at 100° C., respectively. The difference between these positions was calculated as the amount of retraction.

As seen from Table 1, the specific examples 1 to 4 were produced by the drawing so that the eccentricity of the optical fiber was very small. Therefore, the optical connection loss was small. When heated to 100° C., no retraction of the optical fiber occurred.

On the other hand, in the comparative example 5, the single mode propagation was maintained or secured. However, since the eccentricity of the optical fiber in the hole of the ferrule was large, the optical connection loss was great. When heated to 100° C., the amount of retraction of the optical fiber was large.

What is claimed is:

1. A method of producing an optical waveguide component, comprising:
    preparing a tubular member made of glass;
    inserting an optical fiber into said tubular member;
    heating and elongating said tubular member without softening said optical fiber to fusion-bond said tubular member to said optical fiber so that a formed body is obtained; and
    cutting said formed body into a predetermined length.

2. The method according to claim 1, wherein a crystallized glass with crystals deposited therein is used as said glass.

3. The method according to claim 1, wherein said glass is a crystallizable glass which contains no crystal deposited therein and which is transformed into a crystallized glass by depositing a crystal thereon when heated and elongated.

4. The method according to claim 1, wherein said glass contains at least 45 mass % of $SiO_2$, $Al_2O_3$, and $Li_2O$ in total.

5. The method according to claim 1, wherein said glass contains at least 65 mass % of $SiO_2$, $Al_2O_3$, and $Li_2O$ in total.

6. The method according to claim 1, wherein said tubular member has a coefficient of thermal expansion of $-20 \times 10^{-7}/°$ C. to $70 \times 10^{-7}/°$ C. at 30° C. to 380° C.

7. The method according to claim 1, wherein said tubular member has a softening point lower than that of said optical fiber.

8. The method according to claim 1, wherein the heating of said tubular member is carried out at a temperature lower than 1300° C.

* * * * *